US012748856B2

(12) United States Patent
Asai et al.

(10) Patent No.: US 12,748,856 B2
(45) Date of Patent: Sep. 29, 2026

(54) ATTACK SCENARIO GENERATION APPARATUS, ATTACK SCENARIO GENERATION METHOD, AND COMPUTER READABLE MEDIUM

(71) Applicant: MITSUBISHI ELECTRIC CORPORATION, Tokyo (JP)

(72) Inventors: Takeshi Asai, Tokyo (JP); Ryosuke Shimabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 239 days.

(21) Appl. No.: 18/408,699

(22) Filed: Jan. 10, 2024

(65) Prior Publication Data

US 2024/0202345 A1 Jun. 20, 2024

Related U.S. Application Data

(63) Continuation of application No. PCT/JP2021/032676, filed on Sep. 6, 2021.

(51) Int. Cl.
*G06F 21/00* (2013.01)
*G06F 21/57* (2013.01)

(52) U.S. Cl.
CPC ...... *G06F 21/577* (2013.01); *G06F 2221/034* (2013.01)

(58) Field of Classification Search
CPC ......................... G06F 2221/034; G06F 21/577
(Continued)

(56) References Cited

U.S. PATENT DOCUMENTS 12,032,687 B2 * 7/2024 Stokes, III ............ G06F 21/566
12,407,703 B2 * 9/2025 Cho .................... H04L 63/1425
(Continued)

FOREIGN PATENT DOCUMENTS

EP 4254866 A1 * 10/2023 ......... H04L 63/1441
JP 2008-167099 A 7/2008
(Continued)

OTHER PUBLICATIONS

Abe et al., "Eliciting Security Functional Requirements Using Security Targets", Research Report Software Engineering (SE), (SE) [online], Mar. 5, 2015, vol. 2015-SE-187, No. 17, pp. 1-8, particularly, pp. 3-4.
(Continued)

*Primary Examiner* — Josnel Jeudy
(74) *Attorney, Agent, or Firm* — Birch, Stewart, Kolasch & Birch, LLP

(57) ABSTRACT

A diversion determination unit (110) compares a configurational element included in a system threat (21) with a configurational element included in a scenario threat (311) which is a threat corresponded to an analysis scenario (31), where one attack scenario among a plurality of attack scenarios is used as the analysis scenario (31). The diversion determination unit (110) determines based on a comparison result, whether or not the analysis scenario (31) can be diverted to the attack scenario indicating a process up to occurrence of the system threat (21). When it is determined that the analysis scenario (31) can be diverted, a scenario diversion unit (120) generates a new attack scenario (32) indicating the process up to the occurrence of the system threat (21), by diverting the analysis scenario (31).

5 Claims, 13 Drawing Sheets

(58) Field of Classification Search
USPC .............................................................. 726/25
See application file for complete search history.

(56) References Cited

U.S. PATENT DOCUMENTS

| | | | | |
|---|---|---|---|---|
| 2007/0294766 | A1* | 12/2007 | Mir | G06Q 10/06 726/23 |
| 2020/0311284 | A1 | 10/2020 | Sato et al. | |
| 2022/0164438 | A1 | 5/2022 | Kito et al. | |
| 2023/0379351 | A1* | 11/2023 | Mizushima | H04L 63/1433 |

FOREIGN PATENT DOCUMENTS

| | | | |
|---|---|---|---|
| JP | 2018-49361 | A | 3/2018 |
| JP | 2019-219898 | A | 12/2019 |
| JP | 2020-129166 | A | 8/2020 |
| JP | 2020-160611 | A | 10/2020 |
| JP | 2021-5165 | A | 1/2021 |

OTHER PUBLICATIONS

Asai et al., "Security analysis for Automated Countermeasure Selection", Research Report Multimedia Communication and Distributed Processing System (DPS), (DPS) [online], Feb. 25, 2019, vol. 2019-DPS-178, No. 4, pp. 1-7, particularly, pp. 3-7.

International Search Report (PCT/ISA/210) issued in PCT/JP2021/032676 mailed on Nov. 2, 2021.

Japanese Office Action for application No. 2022-515682 issued on Jun. 14, 2022.

Ou et al., "MulVAL: A Logic-based Network Security Analyzer", 14th USENIX Security Symposium, USENIX Association, 2005, pp. 113-128. Total 22 pages.

* cited by examiner

Fig. 2

SIMPLIFIED EXAMPLE.
(1) DETERMINE WHETHER OR NOT "LEAKAGE OF CONFIDENTIAL INFORMATION" IS EXECUTABLE
(FOR THAT PURPOSE) ⇒ (2) DETERMINE "TRANSMIT CONFIDENTIAL INFORMATION TO ATTACKER SERVER" (IF THIS IS EXECUTABLE, (1) IS OK)
(FOR THAT PURPOSE) ⇒ (3) DETERMINE "FIND CONFIDENTIAL INFORMATION"
(IF THIS IS EXECUTABLE, (2) IS OK)
(FOR THAT PURPOSE) ⇒ (4) DETERMINE "INFILTRATE PC CONTAINING CONFIDENTIAL INFORMATION" (IF THIS IS EXECUTABLE, (3) IS OK)

⇩

* DETERMINE ATTACK CONTENTS FROM (1) TO (4) USING INFORMATION RELATING TO SUBJECT AND ATTACK DETERMINATION RULE

* WHEN ALL ATTACKS ARE DETERMINED TO BE EXECUTABLE, OUTPUT SERIES OF ATTACKS AS ATTACK SCENARIO

Fig. 3

■ SPECIFIC EXAMPLE OF ATTACK SCENARIO GENERATION METHOD

◆ QUERY, RULE, AND FACT IN METHOD, AND EXAMPLE

- QUERY ⇒ OBTAINED BY CONVERTING FOR Prolog, THREAT ANALYZED AND IDENTIFIED BY EXISTING TECHNIQUE

EXAMPLE. TAMPERING WITH PLAN FOR FISCAL YEAR 21 ON PC 1

```
informationTamperingOnMachine (Dest_Machine=[PC1 ],InformationAsset=[FY21 Plan])
```

- RULE ⇒ DEPENDENT RELATION BETWEEN THREAT AND ATTACK, OR DEPENDENT RELATION BETWEEN ATTACK AND ATTACK. DEFINED IN THREAT DB OR ATTACK DB.

EXAMPLE. DEPENDENT RELATION BETWEEN THREAT (TAMPERING) AND ATTACK (FILE OPERATION)

```
informationTamperingOnMachine(Dest_Machine,InformationAsset) :-
    informationAssetLocation(InformationAsset,Dest_Machine) ,
    fileManipulation(_Attacker,Dest_Machine,InformationAsset).
```

- FACT ⇒ SYSTEM CONFIGURATIONAL INFORMATION. DEFINE DEVICE, NETWORK, AND CONNECTION INFORMATION THAT ARE IN SYSTEM.

```
machineClass(PC1 , PC).
machineLocation(PC1 , roomA).
networkClass(channel2 , LAN).
networkAccess(PC1 , channel2 , PC2).
```

Fig. 9 CASE 2 OF GENERATION OF ATTACK SCENARIO

Fig. 11 CASE 3 OF GENERATION OF ATTACK SCENARIO

Fig. 12

COMPARISON RESULT C

| | PC 1 | PC 2 | PC 3 |
|---|---|---|---|
| PC 1 | — | machineClass | machineClass informationAssetLocation |
| PC 2 | — | — | |
| PC 3 | — | — | — |

BLANK CELL INDICATES THAT PC 2 AND PC 3 ARE SUBSTANTIALLY EQUAL

ATTACK SCENARIO GENERATION APPARATUS, ATTACK SCENARIO GENERATION METHOD, AND COMPUTER READABLE MEDIUM

CROSS REFERENCE TO RELATED APPLICATIONS

This application is a Continuation of PCT International Application No. PCT/JP2021/032676, filed on Sep. 6, 2021, which is hereby expressly incorporated by reference into the present application.

TECHNICAL FIELD

The present disclosure relates to an attack scenario generation apparatus, an attack scenario generation method, and an attack scenario generation program.

BACKGROUND ART

There is a scenario-based security analysis as a method of a security analysis that analyzes a security threat (hereinafter may be simply abbreviated as a threat) in a system and specifies a process up to occurrence of the threat.

A scenario that represents the process up to the occurrence of the security threat in the system is referred to as an attack scenario.

Patent Literature 1 discloses a method of detailing a security incident in a case where an abnormality caused by the security incident detected in a monitoring object occurs.

CITATION LIST

Patent Literature

Patent Literature 1: JP 2008-167099 A

SUMMARY OF INVENTION

Technical Problem

Patent Literature 1 discloses a technique to detail a detected security incident based on security incident-related information that is constantly collected.

The technique disclosed in Patent Literature 1 has a problem in that detailing cannot be performed when there is no security incident-related information that is consistent with the detected security incident within a predetermined range.

The present disclosure aims to reduce a time required for generation of an attack scenario.

Solution to Problem

An attack scenario generation apparatus according to the present disclosure generates an attack scenario indicating a process up to occurrence of a security threat in a subject system, and the attack scenario generation apparatus includes:

- an analysis memorandum database to store a plurality of attack scenarios which is a plurality of attack scenarios calculated in advance and each of which is corresponded to a threat:
- a diversion determination unit to partially compare a subject element specified from a system threat which is a threat that occurs in the subject system and is a threat for which a new attack scenario to be generated, with a calculated element specified from an analysis scenario and a scenario threat which is a threat corresponded to the analysis scenario, where one attack scenario among the plurality of attack scenarios is used as the analysis scenario, and to determine based on a comparison content obtained by partially comparing the subject element with the calculated element, whether or not the analysis scenario can be diverted to the attack scenario indicating the process up to the occurrence of the system threat: and
- a scenario diversion unit, when it is determined that the analysis scenario can be diverted, to generate the new attack scenario indicating the process up to the occurrence of the system threat, by diverting the analysis scenario.

Advantageous Effects of Invention

In an attack scenario generation apparatus according to the present embodiment, a diversion determination unit determines whether or not an analysis scenario which is one of a plurality of attack scenarios can be diverted to an attack scenario indicating a process up to occurrence of a system threat. If the analysis scenario can be diverted, a scenario diversion unit generates a new attack scenario indicating the process up to the occurrence of the system threat, by diverting the analysis scenario. Therefore, the attack scenario generation apparatus according to the present disclosure has an effect of shortening a time required for generation of the attack scenario.

BRIEF DESCRIPTION OF DRAWINGS

FIG. 2 is a diagram illustrating a simplified example of an attack scenario generation technique.

FIG. 3 is a diagram illustrating a specific example of a query, a rule, and a fact in the attack scenario generation technique.

FIG. 12 is a diagram illustrating an example of a comparison result C according to Embodiment 2.

DESCRIPTION OF EMBODIMENTS

Figure 1:
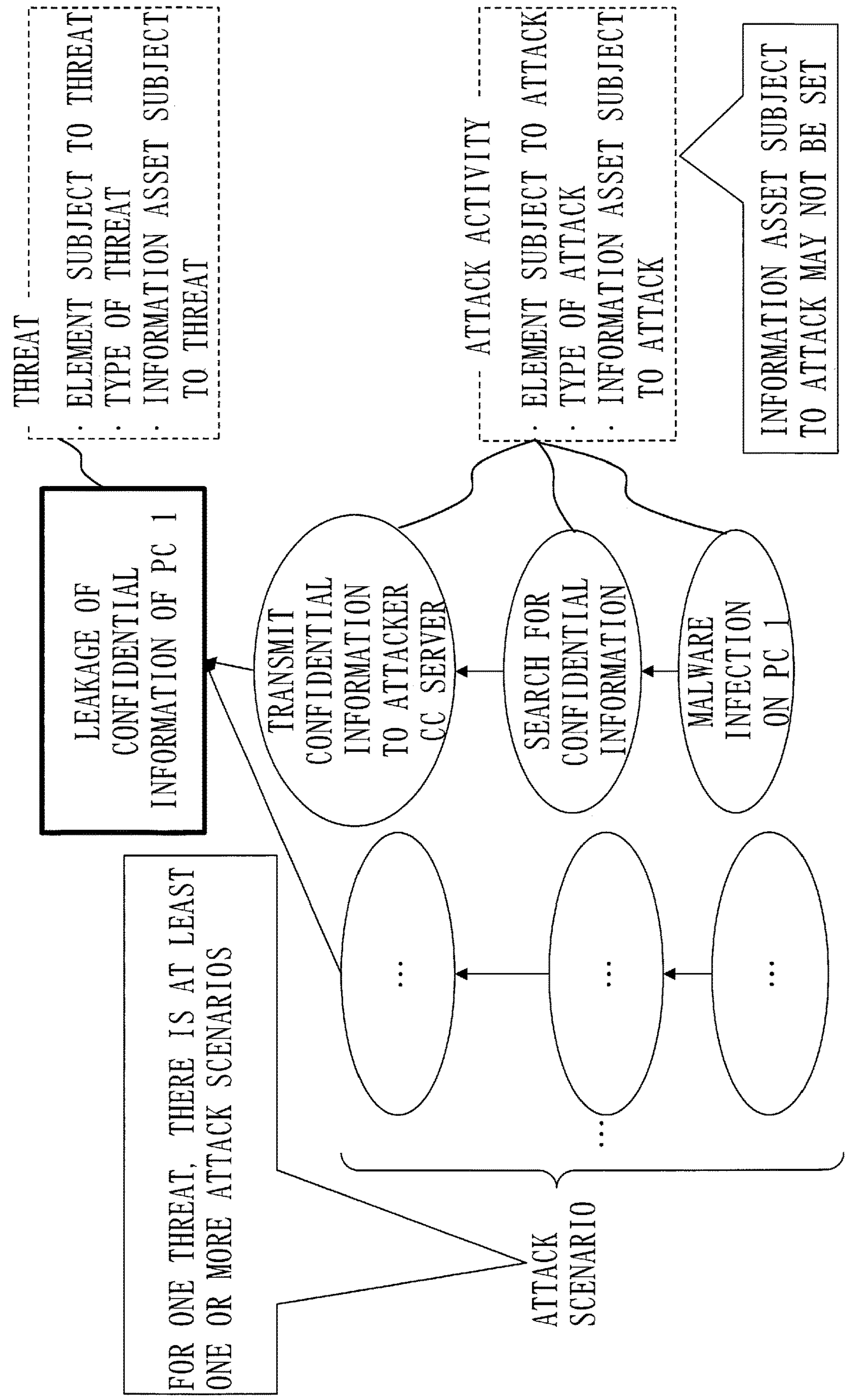
FIG. 1 is a diagram illustrating an example of a configuration of an attack scenario representing a process up to occurrence of a security threat.

An embodiment of the present disclosure will be described hereinafter with reference to the drawings. Throughout the drawings, the same or corresponding parts are denoted by the same reference signs. In the description of the embodiment, description of the same or corresponding parts will be suitably omitted or simplified. In the drawings hereinafter, the relative sizes of components may be different from actual ones. In the description of the embodiment, directions or positions such as "up", "down", "left", "right", "front", "rear", "top side", and "back side" may be indicated. These terms are used only for convenience of description, and are not intended to limit the placement and orientation of components such as devices, equipment, or parts.

Embodiment 1

FIG. 1 is a diagram illustrating an example of a configuration of an attack scenario representing a process up to occurrence of a security threat.

A scenario-based security analysis is a method of a security analysis that specifies against a security threat assumed in a subject system to be analyzed, a process up to occurrence of the security threat. A scenario representing the process up to the occurrence of the threat is referred to as an attack scenario.

The threat is an ultimate goal of an attacker, and a state or an event undesirable for the subject system.

The threat includes a plurality of configurational elements. Specifically, the threat includes an element subject to the threat, a type of the threat, and an information asset subject to the threat, as the configurational elements.

The attack scenario is a list of specified attack activities in chronological order, each of which is obtained by specifying an attack activity performed by an attacker or malware in order to achieve the threat.

The attack scenario is corresponded to the threat. There are at least one or more attack scenarios that achieve one threat.

Each attack activity of the attack scenario consists of an element subject to an attack, a type of the attack, and an information asset subject to the attack. The information subject to the attack may not be set.

Here, an existing attack scenario generation technique which is a premise of an attack scenario generation process by an attack scenario generation apparatus according to the present embodiment, will be described.

FIG. 2 is a diagram illustrating a simplified example of the attack scenario generation technique.

The existing attack scenario generation technique includes a method of recursively determining feasibility of a threat and an attack activity by pattern matching based on the first-order predicate logic. Specifically, there is Multi-host, multi-stage, Vulnerability Analysis Language (MulVAL). The MulVAL performs inference based on the first-order predicate logic, using the logical programming language Prolog.

In the attack scenario generation technique of FIG. 2, attack contents from (1) to (4) are determined using information relating to a subject and an attack determination rule. Then, in the attack scenario generation technique of FIG. 2, when all attacks are determined to be executable, a series of attacks is output as the attack scenario.

As described above, an attack scenario generation technique that outputs an attack scenario by analyzing an attack content is also referred to as an attack scenario analysis technique.

FIG. 3 is a diagram illustrating a specific example of a query, a rule, and a fact in the attack scenario generation technique.

The logical programming language Prolog used in the MulVAL described above consists of three elements which are "fact", "rule", and "query". These are expressed in a form of predicates (argument 1, argument 2, . . . ) with a set of a predicate and an argument.

"Query" is a threat identified in advance by an analysis. A specific example of "query" is a set of a predicate and an argument obtained by converting the threat "tampering with plan for fiscal year 21 on PC 1" identified in advance by the analysis.

"Rule" is a dependent relation between a threat and an attack, or a dependent relation between an attack and an attack. "Rule" is defined in a threat database 201 or an attack method database 202 described in FIG. 6. A specific example of "rule" is a set of a predicate and an argument that represents a dependent relation between a threat (tampering) and an attack (file operation).

"Fact" is system configurational information 203 (refer to FIG. 6) in a subject system. For example, information on such as a device, a network, and connection information that are in the subject system is defined by a set of a predicate and an argument. Each piece of information on such as a device, a network, and connection information that are in the subject system is referred to as an element or a system configurational element.

Figure 4:
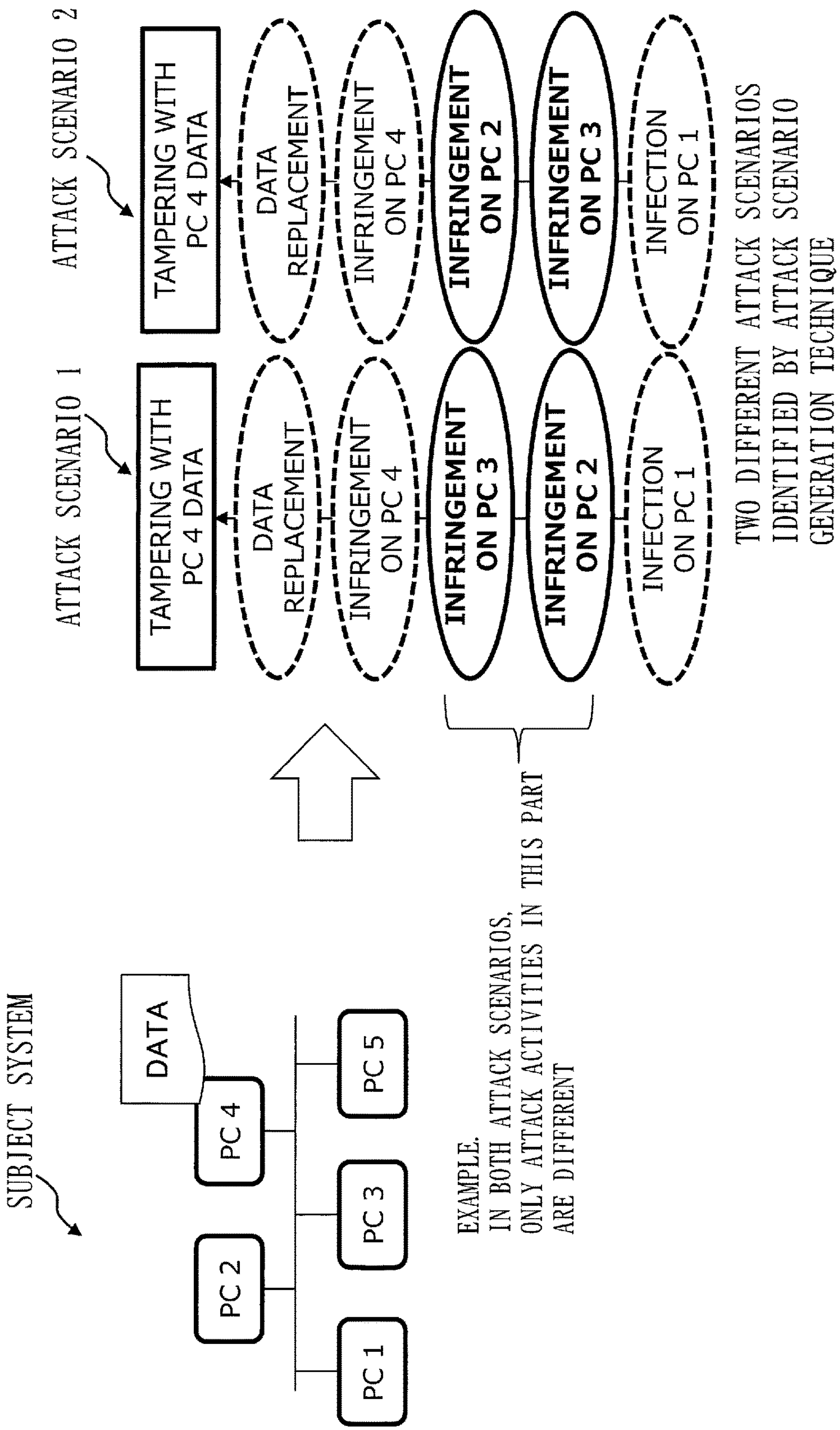
FIG. 4 is a diagram explaining a problem of the attack scenario generation technique.

FIG. 4 is a diagram explaining a problem of the attack scenario generation technique.

In a subject system such as the left diagram of FIG. 4, the existing attack scenario generation technique may take time to exhaustively specify an attack scenario.

There are the following factors as reasons for an increase in an analysis time.

- A scale of a system configuration: as the number of system configurational elements in the subject system increases, the number of intrusion routes per threat exponentially increases.
- The number of connections between system configurational elements: as the number of system configurational elements increases, the number of intrusion routes per threat exponentially increases.
- The number of information assets: the number of threats increases.

As illustrates in the right diagram of FIG. 4, depending on a system, a large amount of equal or approximately equal attack scenarios are output even though the attack scenarios are calculated over a long period of time, and this results in inefficiency.

The right diagram of FIG. 4 illustrates two different attack scenarios which are an attack scenario 1 and an attack scenario 2, identified by the attack scenario generation technique. The attack scenario 1 and the attack scenario 2 are different only in the order of attack activities of "infringement on PC 3" and "infringement on PC 2".

Description of Configuration

Figure 5:
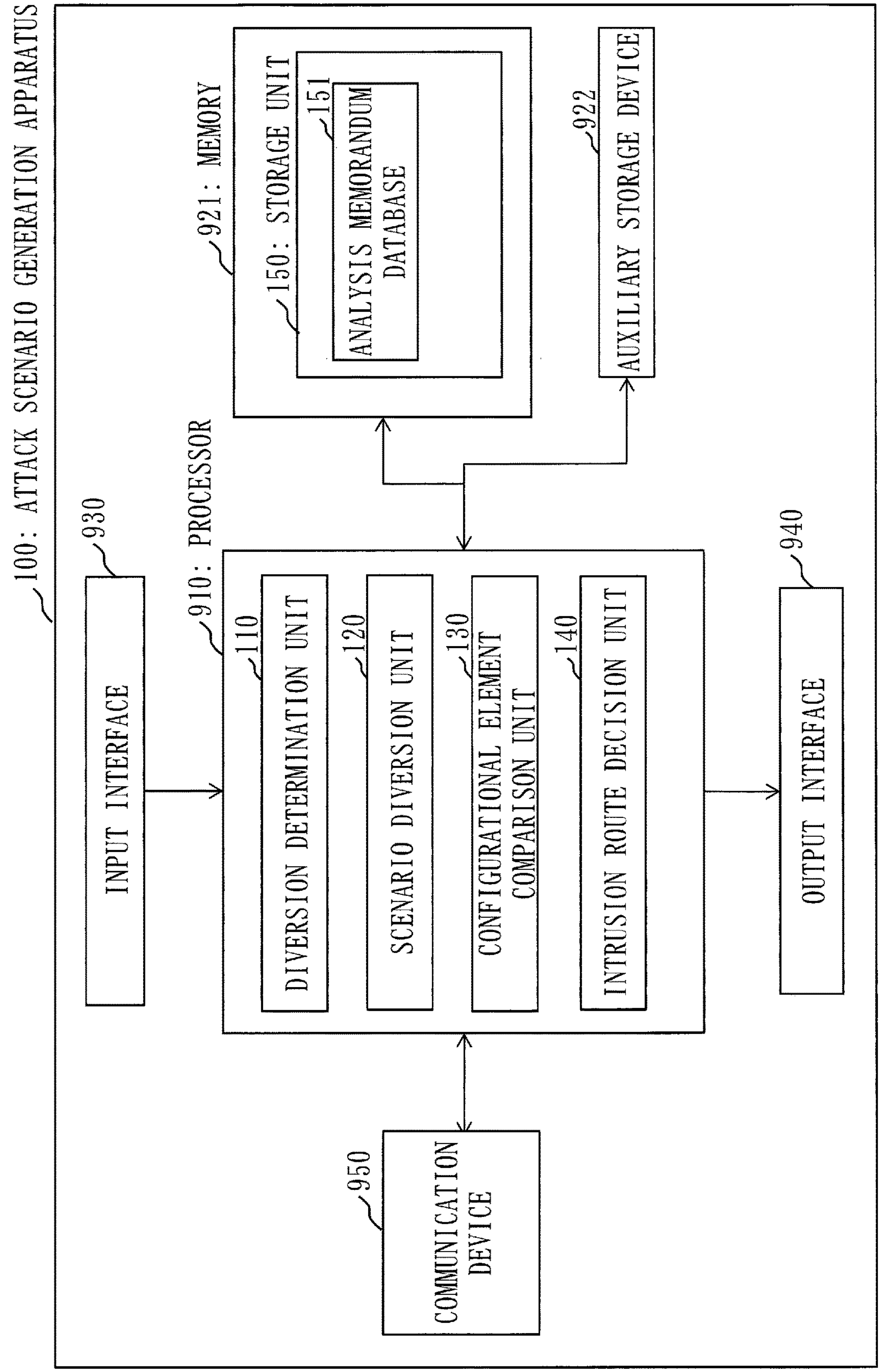
FIG. 5 is a diagram illustrating an example of a configuration of an attack scenario generation apparatus according to Embodiment 1.

FIG. 5 is a diagram illustrating an example of a configuration of an attack scenario generation apparatus 100 according to the present embodiment.

The attack scenario generation apparatus 100 is a computer. The attack scenario generation apparatus 100 includes a processor 910, and also includes other pieces of hardware such as a memory 921, an auxiliary storage device 922, an input interface 930, an output interface 940, and a communication device 950. The processor 910 is connected with the other pieces of hardware via signal lines and controls these other pieces of hardware.

The attack scenario generation apparatus 100 includes a diversion determination unit 110, a scenario diversion unit 120, a configurational element comparison unit 130, an intrusion route decision unit 140, and a storage unit 150, as functional components. The storage unit 150 stores an analysis memorandum database 151.

Functions of the diversion determination unit 110, the scenario diversion unit 120, the configurational element comparison unit 130, and the intrusion route decision unit 140 are implemented by software. The storage unit 150 is provided in the memory 921. The storage unit 150 may be provided in the auxiliary storage device 922, or may be divided and provided in the memory 921 and the auxiliary storage device 922.

The processor 910 is a device that executes an attack scenario generation program. The attack scenario generation program is a program that implements the functions of the diversion determination unit 110, the scenario diversion unit 120, the configurational element comparison unit 130, and the intrusion route decision unit 140.

The processor 910 is an Integrated Circuit (IC) that performs operational processing. Specific examples of the processor 910 are a Central Processing Unit (CPU), a Digital Signal Processor (DSP), and a Graphics Processing Unit (GPU).

The memory 921 is a storage device that stores data temporarily. Specific examples of the memory 921 are a Static Random Access Memory (SRAM) and a Dynamic Random Access Memory (DRAM).

The auxiliary storage device 922 is a storage device that stores data. A specific example of the auxiliary storage device 922 is an HDD. Alternatively, the auxiliary storage device 922 may be a portable storage medium such as an SD (registered trademark) memory card, a CF, NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device such as a mouse, a keyboard, or a touch panel. Specifically, the input interface 930 is a Universal Serial Bus (USB) terminal. The input interface 930 may be a port to be connected with a Local Area Network (LAN).

The output interface 940 is a port to which a cable of an output device such as a display is to be connected. Specifically, the output interface 940 is a USB terminal or a High Definition Multimedia Interface (HDMI) (registered trademark) terminal. Specifically, the display is a Liquid Crystal Display (LCD). The output interface 940 is also referred to as a display interface.

The communication device 950 has a receiver and a transmitter. The communication device 950 is connected to a communication network such as a LAN, the Internet, or a telephone line. Specifically, the communication device 950 is a communication chip or a Network Interface Card (NIC).

The attack scenario generation program is executed in the attack scenario generation apparatus 100. The attack scenario generation program is read into the processor 910 and executed by the processor 910. The memory 921 stores not only the attack scenario generation program but also an Operating System (OS). The processor 910 executes the attack scenario generation program while executing the OS. The attack scenario generation program and the OS may be stored in the auxiliary storage device 922. The attack scenario generation program and the OS stored in the auxiliary storage device 922 are loaded into the memory 921 and executed by the processor 910. Part or the entirety of the attack scenario generation program may be embedded in the OS.

The attack scenario generation apparatus 100 may include a plurality of processors as an alternative to the processor 910. The plurality of processors share execution of the attack scenario generation program. Each of these processors is, as with the processor 910, a device that executes the attack scenario generation program.

Data, information, signal values, and variable values that are used, processed, or output by the attack scenario generation program are stored in the memory 921, the auxiliary storage device 922, or in a register or a cache memory in the processor 910.

"Unit" of each of the diversion determination unit 110, the scenario diversion unit 120, the configurational element comparison unit 130, and the intrusion route decision unit 140 may be interpreted as "circuit", "step", "procedure", "process" or "circuitry". The attack scenario generation program causes a computer to execute a diversion determination process, a scenario diversion process, a configurational element comparison unit process, and an intrusion route decision process. "Process" of each of the diversion determination process, the scenario diversion process, the configurational element comparison unit process, and the intrusion route decision process may be interpreted as "program", "program product", "computer readable storage medium storing a program", or "computer readable recording medium recording a program". Further, an attack scenario generation method is a method performed by executing the attack scenario generation program by the attack scenario generation apparatus 100.

The attack scenario generation program may be stored and provided in a computer readable recording medium. Alternatively, the attack scenario generation program may be provided as a program product.

In the present embodiment, the configurational element comparison unit 130 and the intrusion route decision unit 140 may be omitted.

Description of Functional Summary

Figure 6:
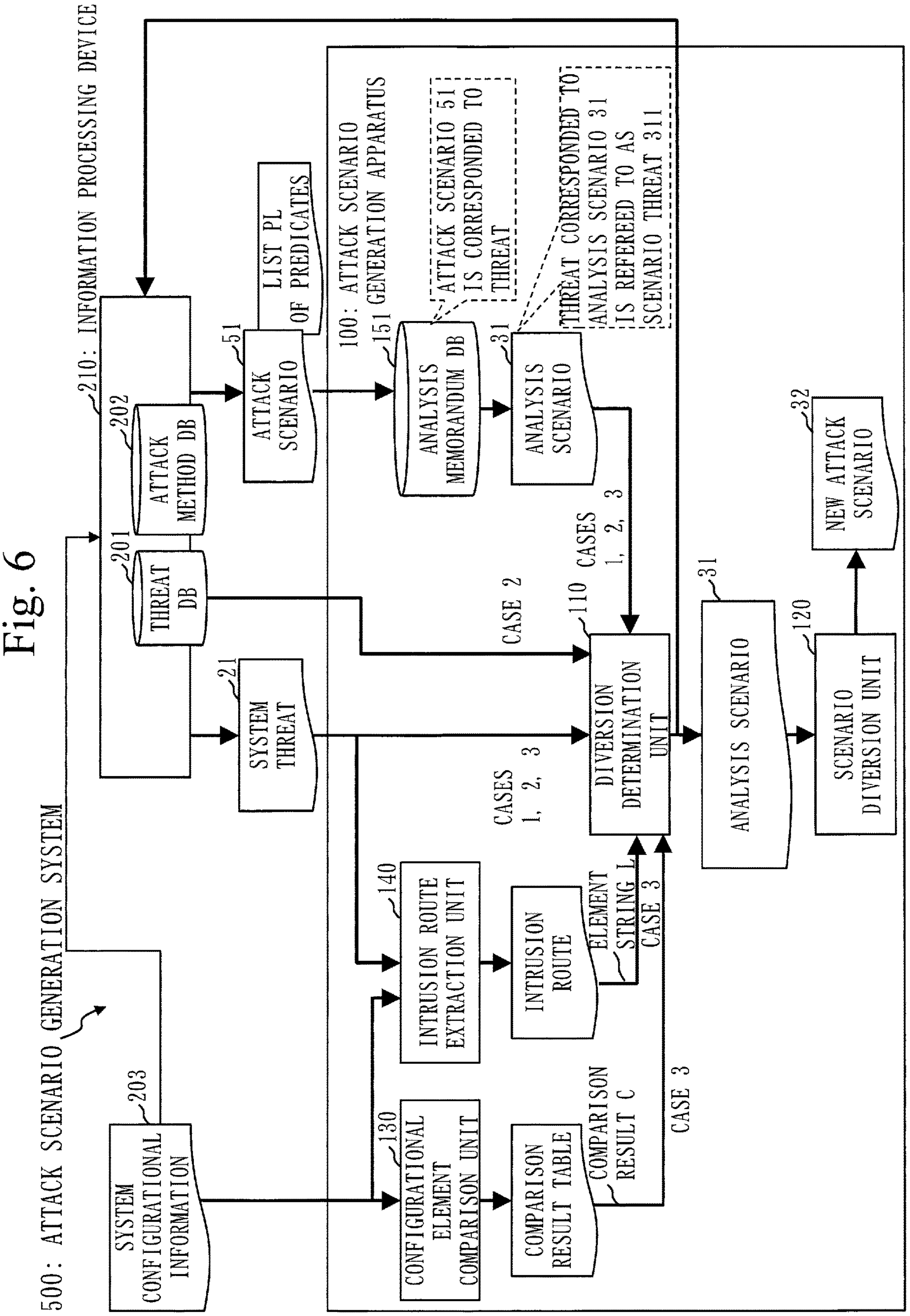
FIG. 6 is a diagram illustrating an example of a functional configuration of the attack scenario generation apparatus according to Embodiment 1.

FIG. 6 is a diagram illustrating an example of a functional configuration of an attack scenario generation system 500 according to the present embodiment.

The attack scenario generation system 500 according to the present embodiment includes an information processing device 210 and the attack scenario generation apparatus 100.

The system configurational information 203 is input to the information processing device 210 and the attack scenario generation apparatus 100.

The system configurational information 203 is information relating to a system configuration of a subject system, and defines a system configurational element in the subject system. For example, the system configurational information 203 defines system configurational elements such as a device, a network, and connection information that are in the subject system.

The information processing device 210 stores a rule for a dependent relation between a threat and an attack, or a dependent relation between an attack and an attack in the threat database 201 or the attack method database 202.

The information processing device 210 specifies in advance, a threat of the subject system as a system threat 21 by the existing security threat generation technique. There may be a plurality of system threats 21 specified in advance.

The attack scenario generation apparatus 100 obtains one system threat among the system threats 21 specified in advance, and executes the attack scenario generation process according to the present embodiment.

Further, the information processing device 210 generates a plurality of attack scenarios 51 by the existing attack scenario generation technique. Each of the plurality of attack scenarios 51 is corresponded to a threat. Further, the information processing device 210 assigns to the attack scenario 51, a list PL of factual predicates in the system configurational information 203 used when analyzing the attack scenario, and outputs the list PL.

The attack scenario generation apparatus 100 stores in the analysis memorandum database 151, the plurality of attack scenarios 51 generated by the information processing device 210 and each of which is corresponded to a threat.

The attack scenario generation apparatus 100 generates an attack scenario indicating a process up to occurrence of a threat in the subject system.

The analysis memorandum database 151 stores the plurality of attack scenarios 51 generated in advance. Each attack scenario of the plurality of attack scenarios 51 is corresponded to a threat.

The diversion determination unit 110 performs the diversion determination process to determine whether or not an analysis scenario 31 can be diverted, using one attack scenario among the plurality of attack scenarios 51 stored in the analysis memorandum database 151, as the analysis scenario 31. A threat corresponded to the analysis scenario 31 is referred to as a scenario threat 311.

Specifically, the diversion determination unit 110 compares configurational elements included in the system threat 21 which is a threat specified based on the system configuration of the subject system, with configurational elements included in the scenario threat 311 which is a threat corresponded to the analysis scenario 31. Then, based on a comparison content, the diversion determination unit 110 determines whether or not the analysis scenario 31 can be diverted to the attack scenario indicating the process up to the occurrence of the system threat 21.

More specifically, the diversion determination unit 110 determines whether or not the analysis scenario 31 can be diverted, based on the comparison content indicating whether or not there is an equal configurational element between the configurational elements included in the system threat 21 and the configurational elements included in the scenario threat 311.

When it is determined that the analysis scenario 31 can be diverted, the scenario diversion unit 120 generates a new attack scenario 32 indicating the process up to the occurrence of the system threat 21, by diverting the analysis scenario 31. Specifically, the scenario diversion unit 120 generates the new attack scenario 32, by replacing at least one configurational element included in the scenario threat 311 with a configurational element included in the system threat 21.

When it is determines that the analysis scenario 31 cannot be diverted, the scenario diversion unit 120 requests generation of the new attack scenario 32 from the information processing device 210 having a scenario generation function of generating the new attack scenario 32 from the system threat 21 without using the analysis scenario 31.

The scenario generation function of generating a new attack scenario without using the analysis scenario 31 is, for example, a function of generating an attack scenario using the existing attack scenario generation technique described above.

The system threat 21 is, as described above, a threat specified in advance based on the system configuration of the subject system. The system threat 21 includes a plurality of configurational elements. Specifically, the system threat 21 includes an element subject to the threat, a type of the threat, and an information asset subject to the threat.

Further, the scenario threat 311 is, as described above, a threat corresponded to configurational elements. Specifically, the scenario threat 311 includes an element subject to the threat, a type of the threat, and an information asset subject to the threat.

<Variation of Attack Scenario Generation Process>

Figure 7:
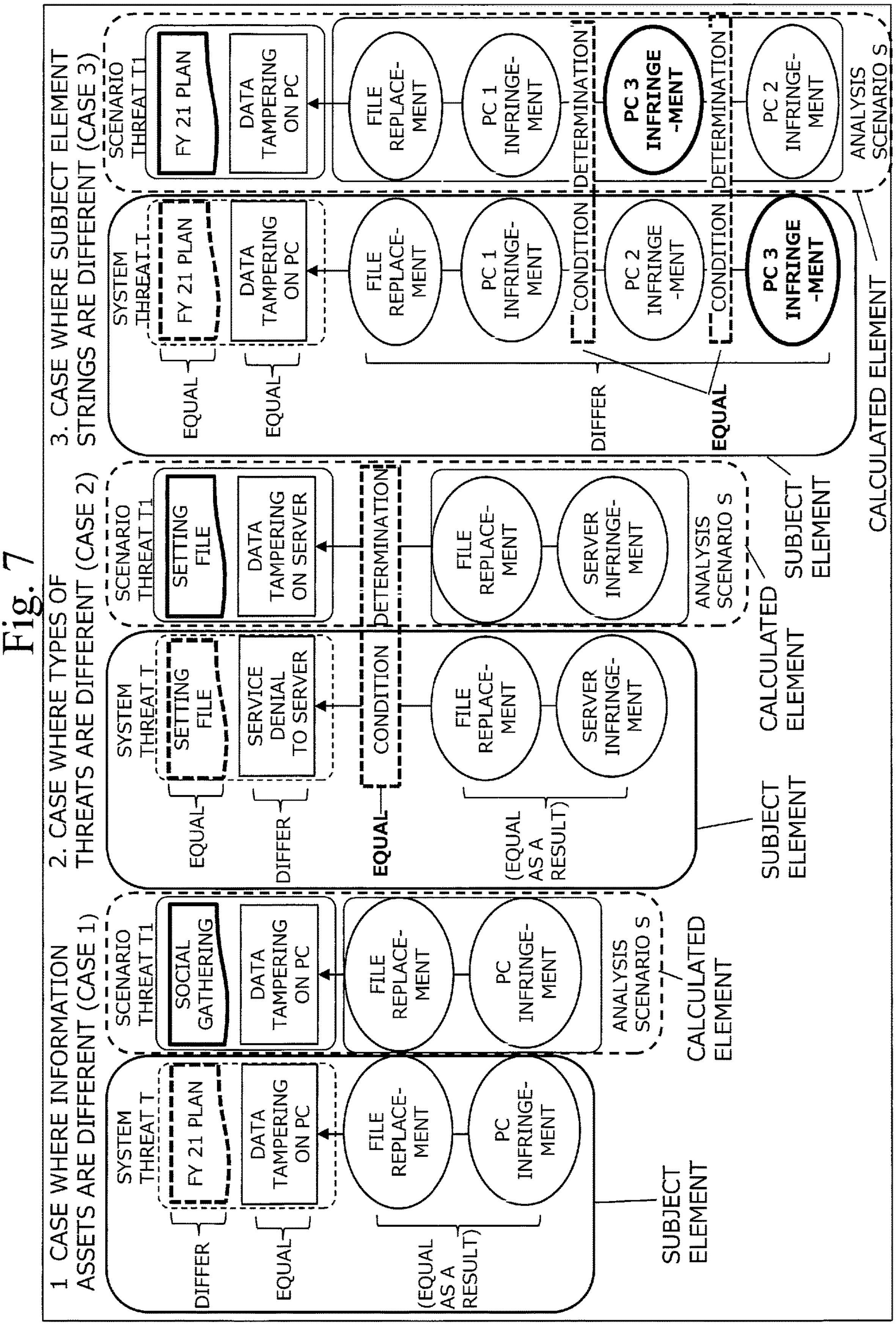
FIG. 7 is a diagram illustrating a variation of an attack scenario generation process by the attack scenario generation apparatus according to Embodiment 1.

FIG. 7 is a diagram illustrating a variation of the attack scenario generation process by the attack scenario generation apparatus 100 according to the present embodiment.

As illustrated in FIG. 7, the attack scenario generation process has the following three cases.

(Case 1) When elements subject to threats and types of the threats are equal, and information assets subject to the threats are different, between a system threat and a scenario threat corresponding to an analysis scenario, an information asset name is replaced.

(Case 2) When elements subject to threats and information assets subject to the threats are equal, and types of the threats are different, between a system threat and a scenario threat corresponding to an analysis scenario, the type of the threat is replaced if achievement conditions of the threats are equal.

(Case 3) When a system threat and a scenario threat corresponding to an analysis scenario are equal, and element strings subject to infringement by an attacker are different, a subject element name is replaced if all facts (but a difference in names of elements subject to attack is ignored) used for attack scenario determination are equal.

In the present embodiment, Case 1 and Case 2 will be described. Case 3 will be described in Embodiment 2.

In each case of FIG. 7, each element specified from a system threat T on the left side is a subject element. Further, each element specified from a scenario threat T1 on the right side is a calculated element. In Case 2, a condition used for condition determination is included in each of the subject elements and the calculated elements. Further, in Case 3, an element string up to a threat is included in each of the subject elements and the calculated elements.

Description of Operation

Next, operation of the attack scenario generation apparatus 100 according to the present embodiment will be described. An operational procedure of the attack scenario generation apparatus 100 is equivalent to the attack scenario generation method. Further, a program that implements the operation of the attack scenario generation apparatus 100 is equivalent to the attack scenario generation program.

<Operational Example of Case 1>

Figure 8:
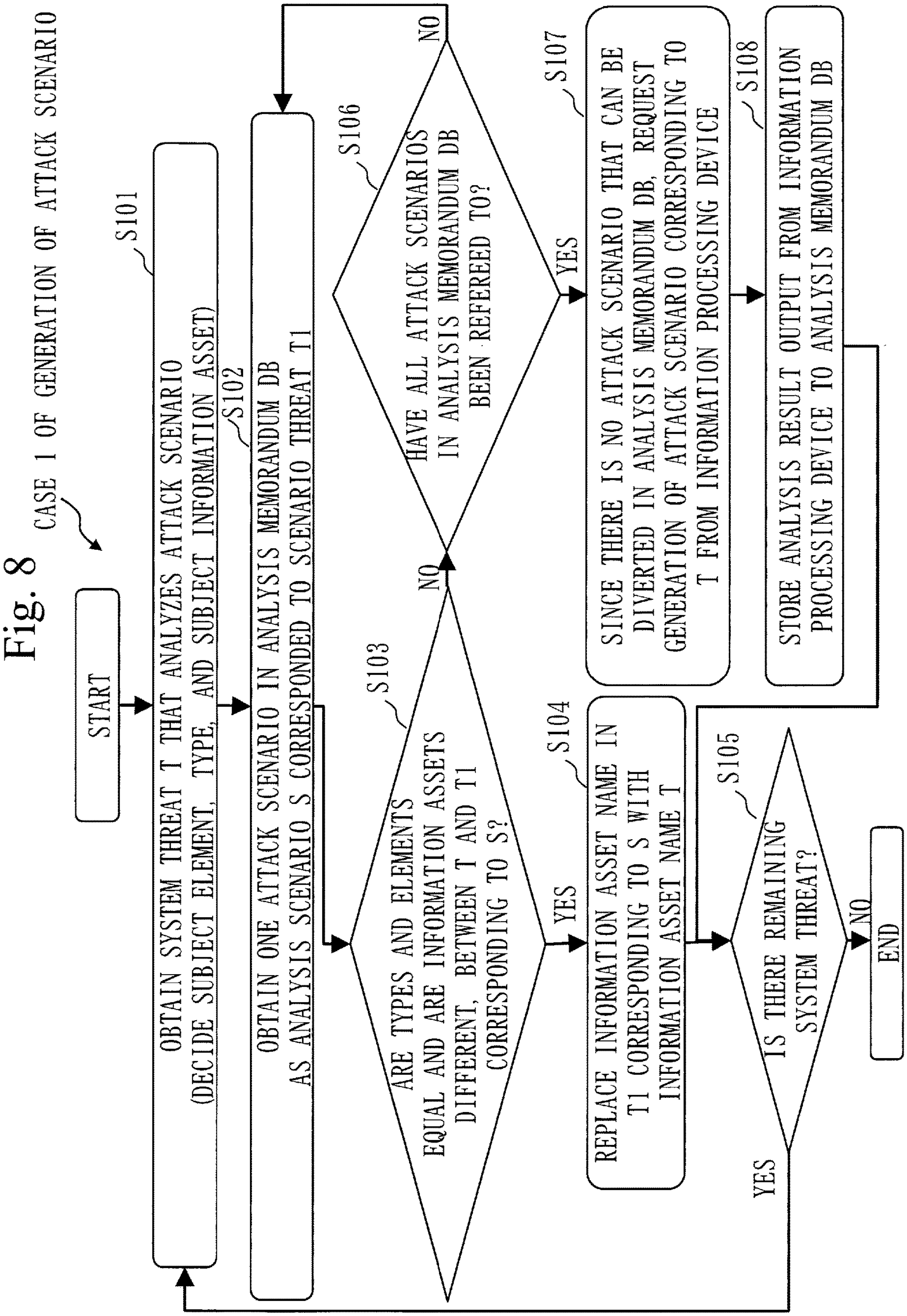
FIG. 8 is a flow diagram illustrating an operational example of Case 1 of the attack scenario generation apparatus according to Embodiment 1.

FIG. 8 is a flow diagram illustrating an operational example of Case 1 of the attack scenario generation apparatus 100 according to the present embodiment.

In step S101, the diversion determination unit 110 obtains the system threat 21 indicating a threat subject to generation of a new attack scenario. An element subject to the threat, a type of the threat, and an information asset subject to the threat are decided as configurational elements included in the system threat 21. The system threat 21 obtained here is assumed to be the system threat T.

When there is a plurality of system threats 21, the diversion determination unit 110 obtains one of them as the system threat T.

In step S102, the diversion determination unit 110 refers to the analysis memorandum database 151, and obtains one attack scenario from among the plurality of attack scenarios 51 stored in the analysis memorandum database 151, as an analysis scenario S. The analysis scenario S obtained here is corresponded to the scenario threat 311. The scenario threat 311 corresponding to the analysis scenario S is assumed to be the scenario threat T1.

As described above, the analysis memorandum database 151 stores in advance, the attack scenario 51 generated by the attack scenario generation technique of the information processing device 210. When the attack scenario 51 is stored in the analysis memorandum database 151, information on a threat corresponding to the attack scenario 51 is also stored together.

In step S103, the diversion determination unit 110 compares configurational elements (at least a part of the subject elements) included in the system threat T with configurational elements (a part of the calculated elements) included in the scenario threat T1 corresponding to the analysis scenario S. Then, based on the comparison content, the diversion determination unit 110 determines whether or not the analysis scenario S can be diverted to an attack scenario indicating a process up to occurrence of the system threat T.

Specifically, when subject elements are equal, types of threats are equal, and subject information assets are different between the configurational elements included in the system threat T and the configurational elements included in the scenario threat T1 corresponding to the analysis scenario S, the diversion determination unit 110 determines that the analysis scenario S can be diverted. When it is determined that the analysis scenario S can be diverted, processing proceeds to step S104.

When the subject elements are not equal, or the types of the threats are not equal, the diversion determination unit 110 determines that the analysis scenario S cannot be diverted and processing proceeds to step S106.

When it is determined in step S103 that the analysis scenario S can be diverted, the scenario diversion unit 120 generates the new attack scenario 32 in step S104, by replacing an information asset name of the scenario threat T1 corresponding to the analysis scenario S with an information asset name of the system threat T. After that, processing proceeds to step S105.

When it is determined in step S103 that the analysis scenario S cannot be diverted, the diversion determination unit 110 determines in step S106 whether or not all attack scenarios 51 in the analysis memorandum database 151 have been referred to as the analysis scenario S. When diversion propriety has already been determined for all attack scenarios 51, processing proceeds to step S107. When there is an undetermined attack scenario 51, processing returns to step S102, the undetermined attack scenario 51 is obtained as the analysis scenario S, and the determination of the diversion propriety of the analysis scenario S is repeated.

When it is determined that all attack scenarios 51 stored in the analysis memorandum database 151 cannot be diverted, the scenario diversion unit 120 requests in step S107 from the information processing device 210 having a scenario generation function, generation of a new attack scenario corresponding to the system threat T.

The scenario generation function of the information processing device 210 is a function of generating the new attack scenario corresponding to the system threat T from the beginning, without using the attack scenarios stored in the analysis memorandum database 151. Specifically, the scenario generation function of the information processing device 210 is a function of generating the new attack scenario 32, by recursively determining whether or not an attack activity can be realized by pattern matching from the system threat T based on the first-order predicate logic.

In step S108, the scenario diversion unit 120 stores the new attack scenario output from the information processing device 210 into the analysis memorandum database 151, as an analysis result.

After step S108, processing proceeds to step S105.

In step S105, the scenario diversion unit 120 determines whether or not an unprocessed system threat 21 remains. When there is the unprocessed system threat 21, processing returns to step S101 and the subsequent processing is repeated by assuming the unprocessed system threat 21 as the system threat T. When there is no unprocessed system threat 21, processing ends.

A specific description will be giving using Case 1 of FIG. 7.

In Case 1 of FIG. 7, types and elements of threats are "data tampering on PC" and are equal between the system threat T and the scenario threat T1 corresponding to the analysis scenario S. Further, information assets are "FY 21 plan" and "social gathering" and not equal between the system threat T and the scenario threat T1 corresponding to the analysis scenario S.

Therefore, in Case 1 of FIG. 7, it is determined that the analysis scenario S can be diverted. The scenario diversion unit 120 outputs the analysis scenario S corresponding to the scenario threat T1, as the new attack scenario 32 corresponding to the system threat, by replacing the information asset "social gathering" of the scenario threat T1 corresponding to the analysis scenario S with the information asset "FY 21 plan" of the system threat T.

As described above, it is possible to generate an attack scenario at high speed in comparison with a process of analyzing the attack scenario from the beginning, by combining the diversion determination process of determining the diversion propriety of the analysis scenario S and the scenario diversion process of generating a new attack scenario by diverting the analysis scenario S when the analysis scenario S can be diverted.

<Operational Example of Case 2>

Figure 9:
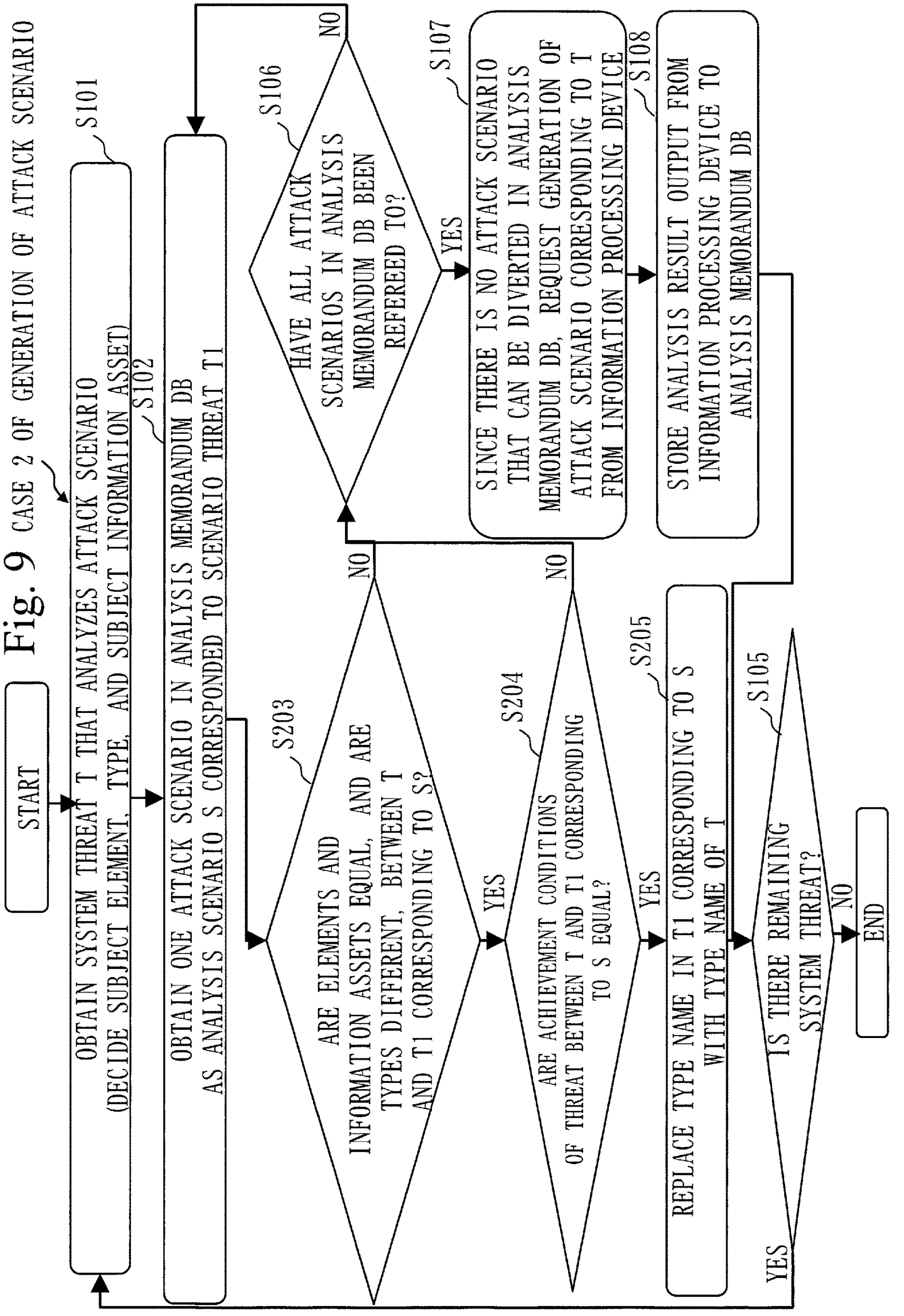
FIG. 9 is a flow diagram illustrating an operational example of Case 2 of the attack scenario generation apparatus according to Embodiment 1.

FIG. 9 is a flow diagram illustrating an operational example of Case 2 of the attack scenario generation apparatus 100 according to the present embodiment.

In FIG. 9, processes of step S101 and step S102 are the same as those of Case 1 described in FIG. 8.

In step S203 and step S204, when subject elements are equal, subject information assets are equal, and types of threats are different, between the configurational elements included in the system threat T and the configurational elements included in the scenario threat T1 corresponding to the analysis scenario S, and also when achievement conditions for achieving the threats are equal between the system threat T and the scenario threat T1, the diversion determination unit 110 determines that the analysis scenario S can be diverted.

A specific description will be given below.

In step S203, the diversion determination unit 110 determines whether or not the subject elements are equal, the information assets are equal, and the types of the threats are different, between the configurational elements (a part of the subject elements) included in the system threat T and the configurational elements (a part of the calculated elements) included in the scenario threat T1 corresponding to the analysis scenario S.

When the subject elements are equal, the information assets are equal, and the types of the threats are different, processing proceeds to step S204.

When the subject elements are not equal, or the information assets are not equal, the diversion determination unit 110 determines that the analysis scenario S cannot be diverted and processing proceeds to step S106.

When the elements are equal, the information assets are equal, and the types of the threats are different, the diversion determination unit 110 determines in step S204 whether or not the achievement condition (a part of the subject elements) for achieving the threat in the system threat T and the achievement condition (a part of the calculated elements) for achieving the threat in the scenario threat T1 corresponding to the analysis scenario S are equal.

An achievement condition for achieving a threat is information indicating what kind of attack activity an attacker needs to perform to achieve the threat.

Specifically, the diversion determination unit 110 obtains from the attack method database 202 that stores a dependency relation between a threat and an attack, the achievement condition corresponding to the system threat T and the achievement condition corresponding to the scenario threat T1 corresponding to the analysis scenario S. The diversion determination unit 110 determines whether or not the achievement conditions of the threats are equal between the system threat T and the scenario threat T1, by comparing the achievement conditions obtained from the attack method database 202 with each other.

When it is determined in step S203 that the subject elements are equal, the information assets are equal, and the types of the threats are different, and also when it is determined in step S204 that the achievement conditions of the threats are equal, the diversion determination unit 110 determines that the analysis scenario S can be diverted.

When it is determined that the analysis scenario S can be diverted, the scenario diversion unit 120 generates the new attack scenario 32 in step S205, by replacing the type of the scenario threat T1 corresponding to the analysis scenario S, with the type of the system threat T. After that, processing proceeds to step S105.

Each of processes from step S105 to step S108 is the same as that of Case 1 described in FIG. 8.

A specific description will be given using Case 2 of FIG. 7.

In Case 2 of FIG. 7, the subject elements are "server" and are equal, and the information assets are "setting file" and are equal, between the system threat T and the scenario threat T1 corresponding to the analysis scenario S. Further, the types of the threats are "service denial" and "data tampering", and are not equal between the system threat T and the scenario threat T1 corresponding to the analysis scenario S.

In Case 2 of FIG. 7, the achievement conditions of the threats are equal, and it is determined that the analysis scenario S can be diverted. When it is determined that the analysis scenario S can be diverted, the scenario diversion unit 120 outputs the analysis scenario S corresponding to the scenario threat T1, as the new attack scenario 32 corresponding to the system threat T, by replacing the type name "data tampering" of the scenario threat T1 corresponding to the analysis scenario S, with the type name "service denial" of the system threat T.

As described above, it is possible to generate an attack scenario at high speed in comparison with a process of analyzing the attack scenario from the beginning, by combining the diversion determination process of determining the diversion propriety of the analysis scenario S and the scenario diversion process of generating a new attack scenario by diverting the analysis scenario S when the analysis scenario S can be diverted.

Other Configurations

In the present embodiment, the functions of the diversion determination unit 110, the scenario diversion unit 120, the configurational element comparison unit 130, and the intrusion route decision unit 140 are implemented by software. As a variation, the functions of the diversion determination unit 110, the scenario diversion unit 120, the configurational element comparison unit 130, and the intrusion route decision unit 140 are implemented by hardware.

Specifically, the attack scenario generation apparatus 100 includes an electronic circuit 909 in place of the processor 910.

Figure 10:
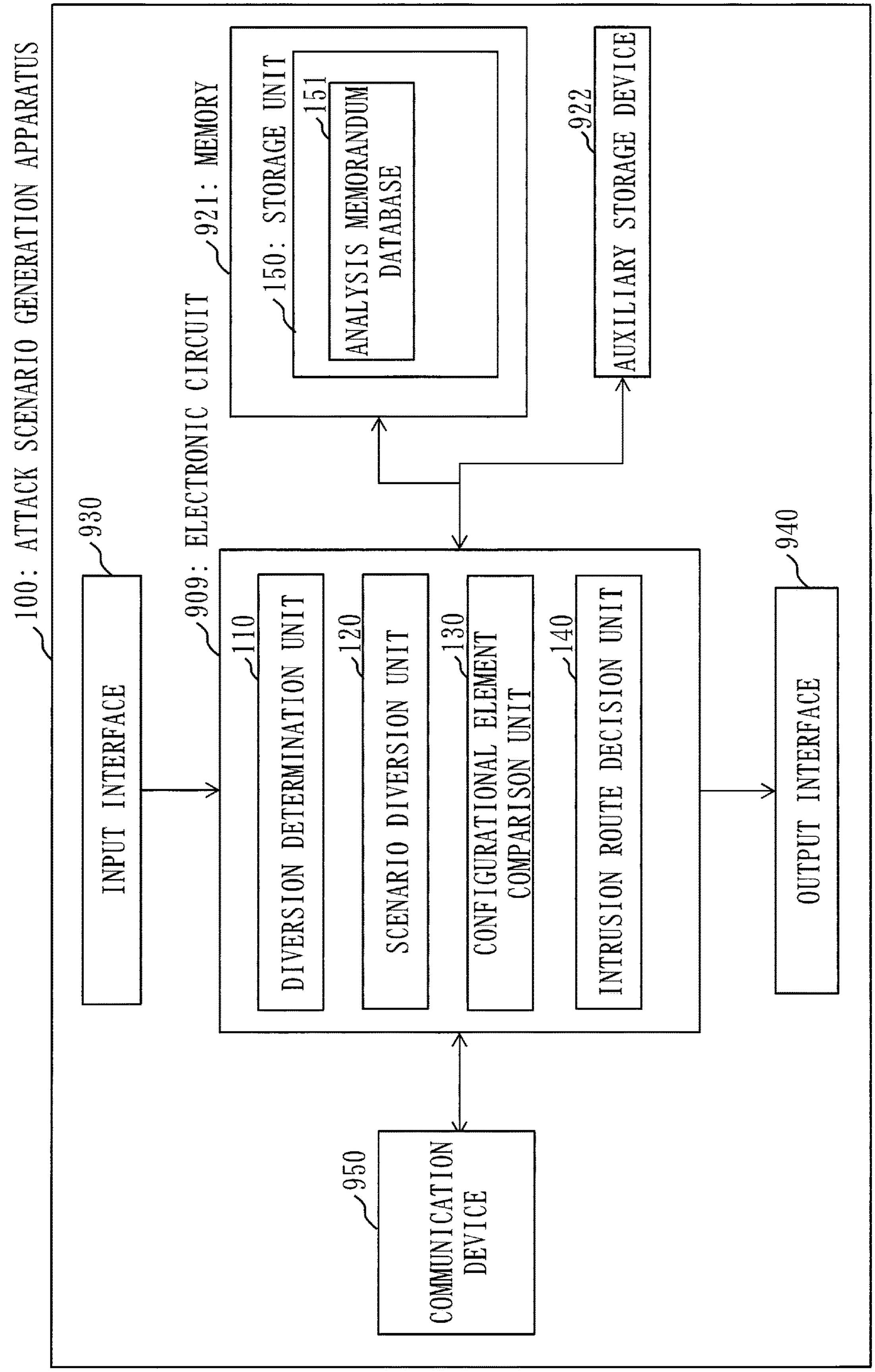
FIG. 10 is a diagram illustrating an example of a configuration of the attack scenario generation apparatus according to a variation of Embodiment 1.

FIG. 10 is a diagram illustrating a configuration of the attack scenario generation apparatus 100 according to the variation of the present embodiment.

The electronic circuit 909 is a dedicated electronic circuit that implements the functions of the diversion determination unit 110, the scenario diversion unit 120, the configurational element comparison unit 130, and the intrusion route decision unit 140. Specifically, the electronic circuit 909 is a single circuit, a composite circuit, a programmed processor, a parallel-programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array.

The functions of the diversion determination unit 110, the scenario diversion unit 120, the configurational element comparison unit 130, and the intrusion route decision unit 140 may be implemented by one electronic circuit, or may be distributed among and implemented by a plurality of electronic circuits.

As another variation, some of the functions of the diversion determination unit 110, the scenario diversion unit 120, the configurational element comparison unit 130, and the intrusion route decision unit 140 are implemented by the electronic circuit, and the remaining of the functions may be implemented by software. Alternatively, some or all of the functions of the diversion determination unit 110, the scenario diversion unit 120, the configurational element comparison unit 130, and the intrusion route decision unit 140 may be implemented by firmware.

Each of the processor and the electronic circuit is also called processing circuitry. That is, the functions of the diversion determination unit 110, the scenario diversion unit 120, the configurational element comparison unit 130, and the intrusion route decision unit 140 may be implemented by the processing circuitry.

Description of Effects of Present Embodiment

As described above, in an attack scenario generation apparatus according to the present embodiment, a diversion determination unit determines whether or not an analysis scenario which is one of a plurality of attack scenarios, can be diverted to an attack scenario indicating a process up to occurrence of a system threat. When the analysis scenario can be diverted, a scenario diversion unit generates a new attack scenario, by replacing configurational elements included in the scenario threat corresponding to the analysis scenario, with configurational elements included in the system threat.

As described above, in the attack scenario generation apparatus according to the present embodiment, it is possible to generate an attack scenario at high speed in comparison with a case of analyzing the attack scenario from the beginning, by combining a diversion determination process by the diversion determination unit with a scenario diversion process by the scenario diversion unit.

Embodiment 2

In the present embodiment, matters different from Embodiment 1 and matters to be added to Embodiment 1 will be mainly described.

In the present embodiment, configurations having the same functions as those of Embodiment 1 are assigned to the same reference numerals, and the description thereof will be omitted.

Description of Configuration

Configurations of the attack scenario generation apparatus 100 according to the present embodiment is the same as those of FIG. 5 and FIG. 6.

In Embodiment 1, a case has been described where it is determined whether or not an attack scenario which is an existing analysis result can be diverted when a new attack scenario is generated, and the attack scenario is generated from the beginning only when the attack scenario cannot be diverted. In Embodiment 1, Case 1 in which an information asset name is replaced and Case 2 in which a type of a threat is replaced, have been particularly described.

In the present embodiment, Case 3 will be described. In the present embodiment, the configurational element comparison unit 130 and the intrusion route decision unit 140 are used in addition to the functional components used in Embodiment 1.

Description of Operation

Figure 11:
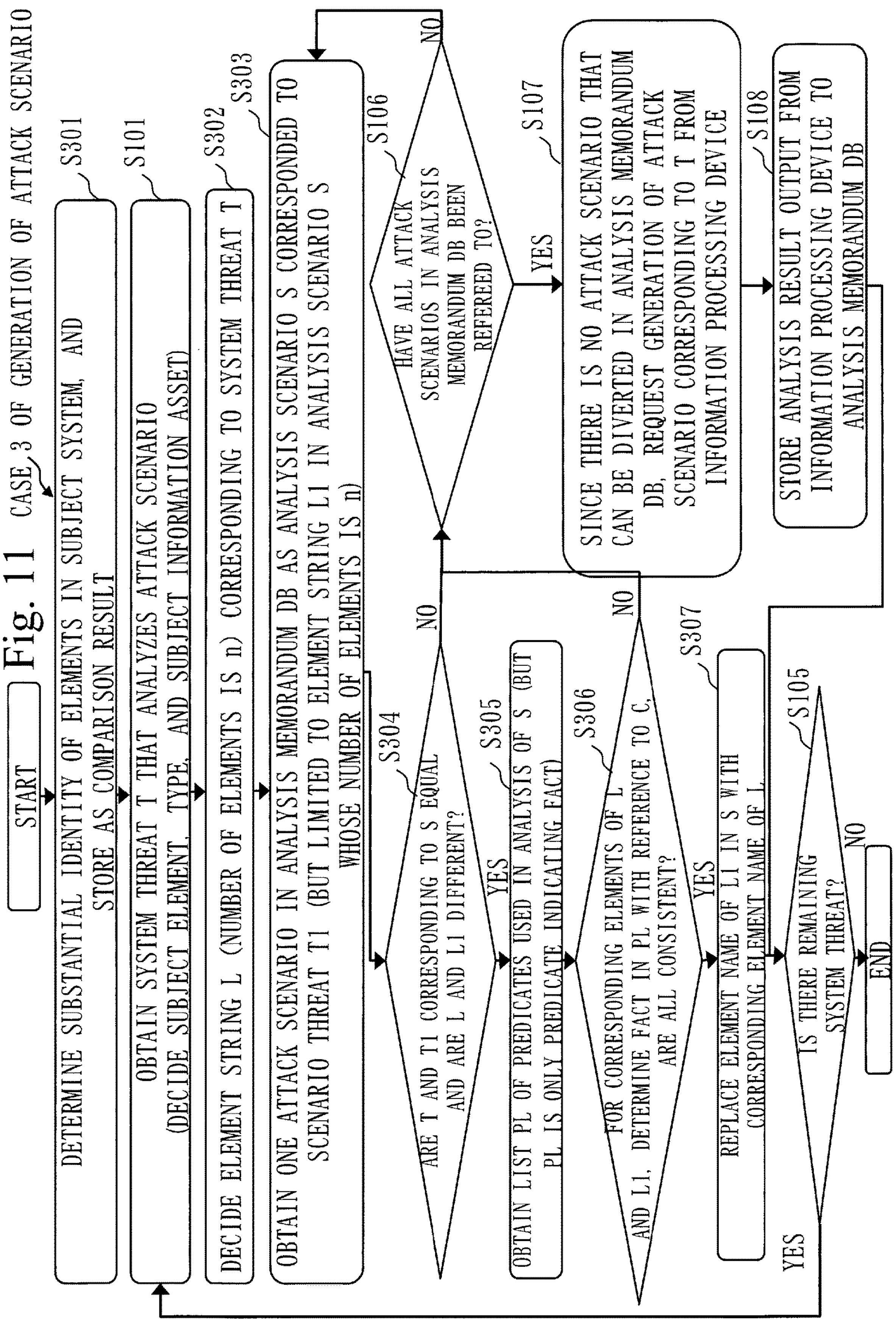
FIG. 11 is a flow diagram illustrating an operational example of Case 3 of the attack scenario generation apparatus according to Embodiment 2.

FIG. 11 is a flow diagram illustrating an operational example of Case 3 of the attack scenario generation apparatus 100 according to the present embodiment.

In step S301, the configurational element comparison unit 130 compares substantial identity between system configurational elements in a subject system, and stores a result of the comparison into the storage unit 150, as a comparison result C.

The configurational element comparison unit 130 compares facts having names of the system configurational elements as variables, and determines that the system configurational elements are substantially equal when they are identical except for the names of the elements. As described in FIG. 3, a fact is represented by a predicate and a variable, and has a name of a system configurational element as a variable.

When the system configurational elements are substantially equal, the configurational element comparison unit 130 sets in the comparison result C, a setting column of setting the result of the comparison between these system configurational elements, as equal information indicating that the system configurational elements are substantially equal. For example, when the system configurational elements are substantially equal, the configurational element comparison unit 130 leaves the setting column blank. The blank is an example of the equal information. Alternatively, when the system configurational elements are substantially equal, the configurational element comparison unit 130 may describe a common predicate for the equal system configurational elements in the setting column. The common predicate is an example of the equal information, Further, when the system configurational elements are no substantially equal, the configurational element comparison unit 130 sets a predicate having a different fact, in the setting column.

FIG. 12 is a diagram illustrating an example of the comparison result C according to the present embodiment.

The comparison result C is tabular information.

A result of comparing facts of all different system configurational elements in a subject system is described in the comparison result C.

Only when facts of system configurational elements are different (but names of the elements are ignored because they are always different), a predicate of a different fact is described in a setting column in the comparison result C. Accordingly, when the setting column of the comparison result C is blank, it means that "(except for the names) the system configurational elements are identical", that is, the system configurational elements are substantially equal.

Next, in step S101, the diversion determination unit 110 obtains the system threat T. Processing of step S101 is the same as that of Case 1 described in FIG. 8.

In step S302, the intrusion route decision unit 140 decides an element string L indicating an order of system configurational elements in the subject system up to the system threat T.

Specifically, the intrusion route decision unit 140 extracts an intrusion route in the subject system up to the system threat T. The intrusion route decision unit 140 decides the element string L corresponding to the system threat, based on this intrusion route. The number of elements at this time is assumed to be n.

In step S303, the diversion determination unit 110 obtains from the plurality of attack scenarios 51 stored in the analysis memorandum database 151, one attack scenario as the analysis scenario S. The analysis scenario S is corresponded to the scenario threat T1.

Further, an element string L1 is decided for the analysis scenario S, as a string of elements to be infringed. The analysis scenario S obtained in step S303 is limited to that in which the number of elements in the element string L1 corresponding to the analysis scenario S is n.

Through processing from step S304 to step S306, the diversion determination unit 110 determines whether or not the analysis scenario S can be diverted. An outline of the processing from step S304 to step S306 will be described below.

The diversion determination unit 110 determines whether or not the configurational elements (a part of the subject elements) of the system threat T and the configurational elements (a part of the calculated elements) of the scenario threat T1 corresponding to the analysis scenario S are all equal, and the element string L (a part of the subject elements) and the element string L1 (a part of the calculated elements) are different. When all the configurational elements are equal, and the element string L and the element string L1 are different, the diversion determination unit 110 further determines substantial identity for each element of a different element string. When it is determined that different element strings are substantially equal, the diversion determination unit 110 determines that the analysis scenario S can be diverted.

A specific description will be given below.

In step S304, the diversion determination unit 110 determines whether or not all configurational elements are equal, and the element string L and the element string L1 are different, between the system threat T and the scenario threat T1 corresponding to the analysis scenario S. The matter that all configurational elements are equal between the system threat T and the scenario threat T1 corresponding to the analysis scenario S means that the system threat T is the same as the scenario threat T1 corresponding to the analysis scenario S.

When the system threat T and the scenario threat T1 corresponding to the analysis scenario S are the same, and the element string L and the element string L1 are different, processing proceeds to step S305. When the system threat T and the scenario threat T1 corresponding to the analysis scenario S are not the same, the diversion determination unit 110 determines that the analysis scenario S cannot be diverted and processing proceeds to step S106.

In step S305 and step S306, the diversion determination unit 110 determines whether or not each element of the element string L and of the element string L1 are substantially equal.

A specific description will be given below.

In step S305, the diversion determination unit 110 obtains the list PL of predicates used in the analysis of the analysis scenario S.

The list PL of predicates is a set of predicates containing only a fact relating to the system configurational information 203 used in the determination and a fact used in the analysis, at a time of analyzing an attack scenario by the information processing device 210. The list PL of predicates lists predicates of these facts.

In step S306, the diversion determination unit 110 determines whether or not corresponding elements between the element string L corresponding to the system threat T and the element string L1 corresponding to the analysis scenario S, are substantially equal.

Specifically, the diversion determination unit 110 determines using the comparison result C, whether or not facts (facts described in the list PL of predicates) used in the analysis are all consistent with facts of elements of the element string L.

More specifically, the diversion determination unit 110 determines whether or not a fact described in the list PL of predicates is described in a corresponding column of the comparison result C. When it is not described, that is, the corresponding column is a blank cell, the diversion determination unit 110 determines that facts of elements of the element string L and the element string L1 are consistent with each other in the analysis, that is, they are substantially equal.

Thus, in processing of step S306, it is possible to reduce a processing load at a time of determining whether or not all elements are consistent with each other, by using the comparison result C.

This is because when there are a large number of similar elements, the determination process is faster to determine whether or not there is a different element, than to determine whether or not "facts" for elements are the same. If there is a blank cell, those elements may be immediately determined to be equal in the analysis, and the processing load is lighter in comparison with a case of "describing and confirming an identical fact (except for a name)".

As processing for a case where the cell is not blank, it may be determined to be equal only when a predicate that is not in the list PL of predicates is described. On the other hand, when a predicate that is in the list PL of predicates is described, it is determined that it is not substantially equal, that is, corresponding elements are not consistent with each other.

When all corresponding elements between the element string L and the element string L1 are substantially equal, the diversion determination unit 110 determines that the analysis scenario S can be diverted, and processing proceeds to step S307. When there is an element that is not substantially equal among the corresponding elements between the element string L and the element string L1, the diversion determination unit 110 determines that the analysis scenario S cannot be diverted and processing proceeds to step S106.

When it is determined that the analysis scenario S can be diverted, the scenario diversion unit 120 generates the new attack scenario 32 in step S307, by replacing an element name of the element string L1 corresponding to the analysis scenario S, with an element name of the element string L corresponding to the system threat T. After that, processing proceeds to step S105.

Each processing from step 105 to step S108 is the same as that in Case 1 described in FIG. 8.

Figure 13:
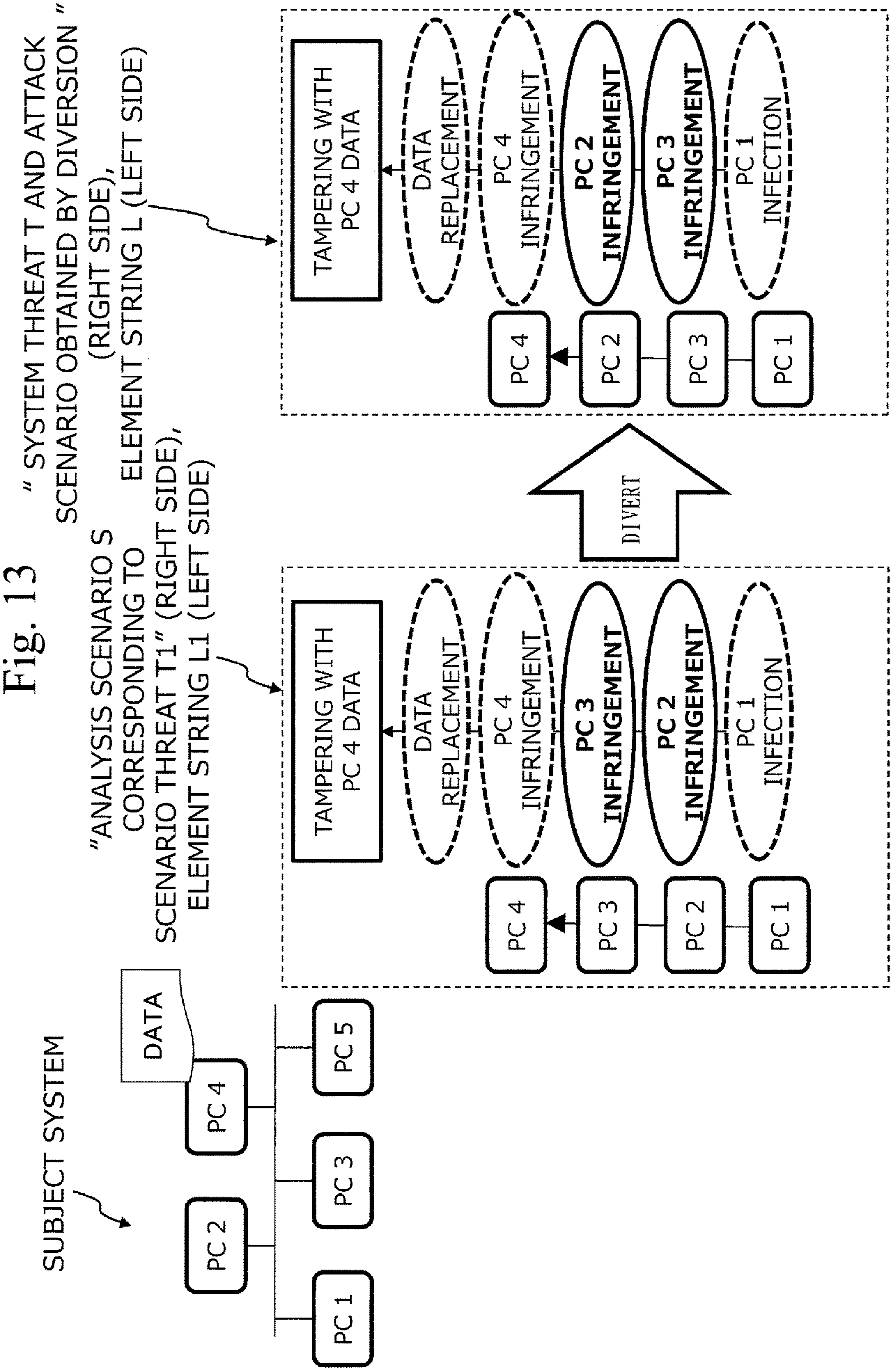
FIG. 13 is a diagram illustrating Case 3 according to Embodiment 2.

FIG. 13 is a diagram illustrating a specific example of Case 3 of the attack scenario generation process according to the present embodiment.

Case 3 will be described with reference to FIG. 13.

The left diagram represents system configurational information on a subject system.

In the central diagram, the analysis scenario S corresponding to the scenario threat T1 is on the right side and the element string L1 corresponding to the analysis scenario S is on the left side.

In the right diagram, the system threat T and an attack scenario obtained by diversion are on the right side, and the element string L corresponding to the system threat T on the left side.

In FIG. 13, the system threat T and the system threat T1 corresponding to the analysis scenario S are "tampering with PC 4 data", and are equal.

On the other hand, the element string L corresponding to the system threat T is PC 1→PC 3→PC 2→PC 4, and the element string L1 corresponding to the analysis scenario S is PC 1→PC 2→PC 3→PC 4. The element string L differs from the element string L1. In the element string L and the element string L1, the order of PC 2 and PC 3 to be infringed is reversed.

Hence, the diversion determination unit 110 determines whether or not corresponding elements between the element string L and the element string L1 are substantially equal.

As illustrated in the comparison result C of FIG. 12, it is assumed that PC 2 and PC 3 are determined to be substantially equal. Since PC 2 and PC 3 are substantially equal, the diversion determination unit 110 determines that corresponding elements between the element string L and the element string L1 are all substantially equal.

As described above, the diversion determination unit 110 determines that the analysis scenario S can be diverted.

Since it is determined that the analysis scenario S can be diverted, the scenario diversion unit 120 obtains the new attack scenario 32, by replacing the element name "PC 1→PC 2→PC 3→PC 4" of the element string L1, with the element name "PC 1→PC 3→PC 2→PC 4" of the element string L.

Other Configurations

As a modified example of the present embodiment, it is possible to combine Case 3 with Case 1, or with Case 2.

When the system threat T and the scenario threat T1 corresponding to the analysis scenario S are not the same in step S304 of FIG. 11, the diversion propriety of the analysis scenario S may be determined by performing processing of Case 1 or Case 2.

Description of Effects of this Embodiment

As described above, it is possible to generate an attack scenario at high speed in comparison with a process of analyzing the attack scenario from the beginning, by combining the diversion determination process of determining the diversion propriety of the analysis scenario S and the scenario diversion process of generating a new attack scenario by diverting the analysis scenario S when the scenario S can be diverted.

In Embodiments 1 and 2 above, each unit of the attack scenario generation apparatus has been described as an independent functional block. However, a configuration of the attack scenario generation apparatus may be different from the configuration in the above embodiments. The functional blocks of the attack scenario generation apparatus may be configured in any way, provided that the functions described in the above embodiments can be implemented. The attack scenario generation apparatus may be a system configured with a plurality of devices instead of one apparatus.

Portions of Embodiments 1 and 2 may be implemented in combination. Alternatively, one portion of these embodiments may be implemented. These embodiments may be implemented as a whole or partially in any other combination.

That is, in Embodiments 1 and 2, portions of each embodiment may be freely combined, any functional element of each embodiment may be modified, or any functional element may be omitted in each embodiment.

The embodiments described above are essentially preferable examples and are not intended to limit the scope of the present disclosure, the scope of applications of the present disclosure, and the scope of uses of the present disclosure. The embodiments described above can be modified in various ways as necessary.

REFERENCE SIGNS LIST

21: system threat: 31: analysis scenario: 311: scenario threat: 32: new attack scenario: 51: attack scenario; 100: attack scenario generation apparatus: 110: diversion determination unit: 120: scenario diversion unit: 130: configurational element comparison unit: 140: intrusion route decision unit: 150: storage unit: 151: analysis memorandum database: 201: threat database: 202: attack method database: 203: system configurational information: 210: information processing device: 500: attack scenario generation system: 909: electronic circuit: 910: processor: 921: memory: 922: auxiliary storage device: 930: input interface: 940: output interface: 950: communication device.

The invention claimed is:

1. An attack scenario generation apparatus that generates an attack scenario indicating a process up to occurrence of a security threat in a subject system, the attack scenario generation apparatus comprising:

an analysis memorandum database to store a plurality of attack scenarios which is calculated in advance, and each of which consists of attack activities listed in chronological order and each of which is corresponded to a threat; and processing circuitry:

to specify a configurational element of a system threat which is a threat that occurs in the subject system and which is a threat for which a new attack scenario is to be generated, and a subject element that includes a system element string which is an element string indicating an order of system configurational elements in the subject system up to the system threat, and to obtain one attack scenario among the plurality of attack scenarios stored in the analysis memorandum database, as an analysis scenario;

to obtain the system element string and a scenario element string of a calculated element, the calculated element being generated from one of the stored plurality of attack scenarios and including the scenario element string which is an element string corresponding to attack activities that consist of the analysis scenario and configurational elements of a scenario threat which is a threat corresponded to the analysis scenario;

when all configurational elements are equal, and the system element string and the scenario element string are different, between the system threat and the scenario threat, to determine whether or not configurational elements of each of the different system element string and scenario element string are equal, and when it is determined that all configurational elements of the different system element string and scenario element string are equal, to determine that the analysis scenario can be diverted; and when it is determined that the analysis scenario can be diverted, to generate the new attack scenario corresponding to the system threat, by replacing the element name of the scenario element string, with the element name of the system element string.

2. The attack scenario generation apparatus according to claim 1, wherein the processing circuitry compares identity of system configurational elements included in the subject system, and stores a result of the comparison as a comparison result.

3. The attack scenario generation apparatus according to claim 2, wherein the comparison result is tabular information, and when the system configurational elements are equal, the processing circuitry sets in the comparison result, a setting column of setting the result of the comparison between the equal system configurational elements, as equal information indicating that the system configurational elements are equal.

4. An attack scenario generation method used for an attack scenario generation apparatus that generates an attack scenario indicating a process up to occurrence of a security threat in a subject system, wherein the attack scenario generation apparatus includes an analysis memorandum database to store a plurality of attack scenarios which is calculated in advance, and each of which consists of attack activities listed in chronological order and each of which is corresponded to a threat, and the attack scenario generation method comprising:

specifying a configurational element of a system threat which is a threat that occurs in the subject system and which is a threat for which a new attack scenario is to be generated, and a subject element that includes a system element string which is an element string indicating an order of system configurational elements in the subject system up to the system threat, and obtaining one attack scenario among the plurality of attack scenarios stored in the analysis memorandum database, as an analysis scenario, obtaining the system element string and a scenario element string of a calculated element, the calculated element being generated from one of the stored plurality of attack scenarios and including the scenario element string which is an element string corresponding to attack activities that consist of the analysis scenario and configurational elements of a scenario threat which is a threat corresponded to the analysis scenario, and when all configurational elements are equal, and the system element string and the scenario element string are different, between the system threat and the scenario threat, determining whether or not configurational elements of each of the different system element string and scenario element string are equal, and when it is determined that all configurational elements of the different system element string and scenario element string are equal, determining that the analysis scenario can be diverted, and when it is determined that the analysis scenario can be diverted, generating the new attack scenario corresponding to the system threat, by replacing the element name of the scenario element string, with the element name of the system element string.

5. A non-transitory computer readable medium storing an attack scenario generation program used for an attack scenario generation apparatus that generates an attack scenario indicating a process up to occurrence of a security threat in a subject system, wherein the attack scenario generation apparatus includes an analysis memorandum database to store a plurality of attack scenarios which is calculated in advance, and each of which consists of attack activities listed in chronological order and each of which is corresponded to a threat, and the attack scenario generation program causing the attack scenario generation apparatus which is a computer to execute:

a diversion determination process to specify a configurational element of a system threat which is a threat that occurs in the subject system and which is a threat for which a new attack scenario is to be generated, and a subject element that includes a system element string which is an element string indicating an order of system configurational elements in the subject system up to the system threat, and to obtain one attack scenario among the plurality of attack scenarios stored in the analysis memorandum database, as an analysis scenario, to obtain the system element string and a scenario element string of a calculated element, the calculated element being generated from one of the stored plurality of attack scenarios and including the scenario element string which is an element string corresponding to attack activities that consist of the analysis scenario and configurational elements of a scenario threat which is a threat corresponded to the analysis scenario, and when all configurational elements are equal, and the system element string and the scenario element string are different, between the system threat and the scenario threat, to determine whether or not configurational elements of each of the different system element string and scenario element string are equal, and when it is determined that all configurational elements of the different system element string and scenario element string are equal, to determine that the analysis scenario can be diverted, and when it is determined that the analysis scenario can be diverted, a scenario diversion process to generate the new attack scenario corresponding to the system threat, by replacing the element name of the scenario element string, with the element name of the system element string.

* * * * *